(12) United States Patent
Kwun et al.

(10) Patent No.: US 11,005,932 B1
(45) Date of Patent: May 11, 2021

(54) METHOD FOR ASSOCIATING DATA BETWEEN A PLURALITY OF BLOCKCHAIN NETWORKS AND APPARATUS THEREOF

(71) Applicant: SAMSUNG SDS CO., LTD., Seoul (KR)

(72) Inventors: Young Wn Kwun, Seoul (KR); Jung Woo Cho, Seoul (KR); Jun Tae Kim, Seoul (KR); Kwang Cheol Lee, Seoul (KR); Hwa Yong Oh, Seoul (KR); Chang Suk Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/664,446

(22) Filed: Oct. 25, 2019

(30) Foreign Application Priority Data

Oct. 18, 2019 (KR) .................. 10-2019-0129660

(51) Int. Cl.
| | |
|---|---|
| *H04L 29/08* | (2006.01) |
| *H04L 9/06* | (2006.01) |
| *H04L 29/06* | (2006.01) |
| *G06F 9/50* | (2006.01) |

(52) U.S. Cl.
CPC ........ *H04L 67/1059* (2013.01); *G06F 9/5038* (2013.01); *H04L 9/0643* (2013.01); *H04L 63/123* (2013.01); *H04L 2209/38* (2013.01)

(58) Field of Classification Search
CPC . H04L 67/1059; H04L 9/0643; H04L 63/123; H04L 2209/38; G06F 9/5038

USPC ........................................ 709/202
See application file for complete search history.

(56) References Cited

U.S. PATENT DOCUMENTS

| | | | |
|---|---|---|---|
| 10,200,197 B1 * | 2/2019 | Li | H04L 9/3239 |
| 2018/0191502 A1 * | 7/2018 | Karame | H04L 9/0825 |
| 2019/0378139 A1 * | 12/2019 | Stribady | H04L 63/12 |
| 2020/0204338 A1 * | 6/2020 | Bougalis | H04L 9/30 |

FOREIGN PATENT DOCUMENTS

| | | | |
|---|---|---|---|
| KR | 10-1922565 B1 | 11/2018 | |
| KR | 101922565 B1 * | 11/2018 | ......... G06Q 20/3678 |
| KR | 102017675 B1 * | 9/2019 | ............. G06Q 20/10 |

* cited by examiner

*Primary Examiner* — Umar Cheema
*Assistant Examiner* — John Fan
(74) *Attorney, Agent, or Firm* — The PL Law Group, PLLC

(57) ABSTRACT

A method for interworking data between a plurality of blockchain networks according to an embodiment of the inventive concept includes performing a first phase of a transaction by dividing steps of the transaction for recording data and performing a second phase of the transaction according to a result of performing the first phase, wherein performing the first phase comprises performing a first step of a first transaction for recording the data in a first blockchain network of a plurality of blockchain networks and requesting to perform a first step of a second transaction for recording the data in a second blockchain network of the plurality of blockchain networks. It may be available to interwork data between a plurality of blockchain networks without passing through a separate hub network, and ensure the concurrency of interworked data recording.

14 Claims, 11 Drawing Sheets

FIG. 2
1000
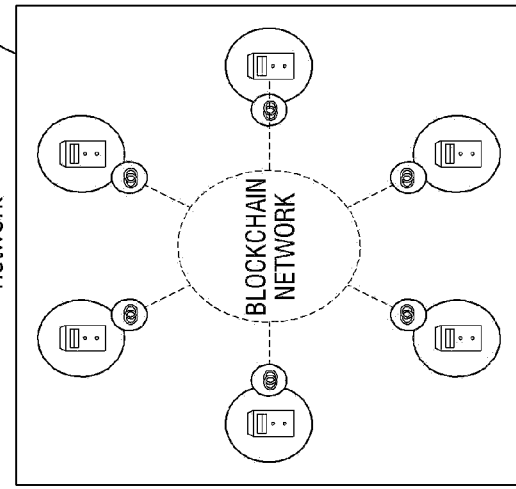
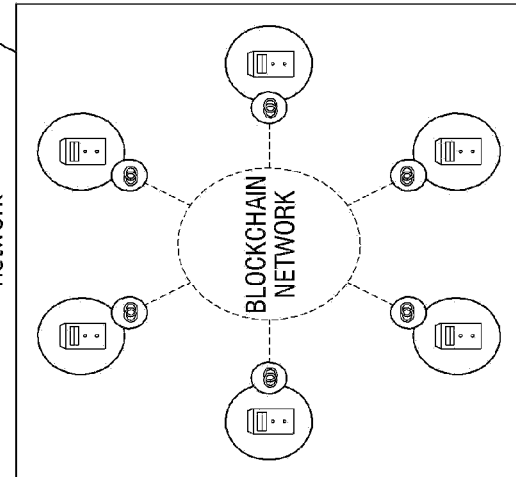

METHOD FOR ASSOCIATING DATA BETWEEN A PLURALITY OF BLOCKCHAIN NETWORKS AND APPARATUS THEREOF

CROSS REFERENCE TO RELATED APPLICATIONS AND CLAM OF PRIORITY

This application claims the benefit of Korean Patent Application No. 10-2019-0129660 filed on Oct. 18, 2019 in the Korean Intellectual Property Office, the disclosure of which is incorporated herein by reference in its entirety.

1. Field

The present inventive concept relates to a method for interworking data between a plurality of blockchain networks and a device thereof. More specifically, it relates to a method for interworking data such that the same data is shared and recorded between different blockchain networks and a device on which the method is performed.

2. Description of the Related Art

Blockchain is a data management technology that records continuously increasing data in a specific unit of block, and each blockchain node constituting a peer-to-peer (P2P) network manages a block as a chain-type data structure. The blockchain may ensure the integrity and security of transactions through a consensus process where every blockchain node belonging to a network verifies and records all transactions.

Blockchain networks are generally configured to be independent of other blockchain networks and to verify and record data within their own networks. For example, as shown in FIG. 1, an A blockchain network 1 may share data only between nodes belonging to its own network, and it is difficult to exchange and share data between networks in principle with other B blockchain networks 2.

Therefore, if some data was to be recorded on a plurality of blockchain networks, each had to be recorded on a separate blockchain network through a completely separate recording action. However, in such a method, when data recording is successful in one blockchain network and data recording fails in another blockchain network, data inconsistency between the blockchain networks could not be avoided. In addition, since data is recorded through completely separate actions, a time at which data is recorded on individual blockchain networks may be greatly different. Therefore, there is a problem that data may be inconsistent for a considerable time even when data recording is successful in a blockchain network.

In order to solve this problem, efforts have been made to interwork data between a plurality of blockchain networks. As one such effort, a method for interworking data by establishing a hub network between different blockchain networks has been proposed. However, in a method for interworking data through a hub network, since interworking data is stored in a hub network which is a public blockchain, there is a problem that it cannot be used in a field dealing with important trade secrets. In addition, since data is first recorded in one blockchain network and then data is interlocked to another blockchain network through a hub network, it is difficult to achieve concurrency (or atomicity) of data recording.

SUMMARY

Aspects of the inventive concept provide a method for interworking data between a plurality of blockchain networks such that the same data is recorded and managed between different blockchain networks, and a device on which the method is performed.

Aspects of the inventive concept also provide a method for interworking data between a plurality of blockchain networks that may prevent data leakage by interworking data between blockchain networks without passing through a separate hub network, and a device on which the method is performed.

Aspects of the inventive concept also provide a method for interworking data between a plurality of blockchain networks that may guarantee the concurrency of data recording in interworking data between a plurality of blockchain networks, and a device on which the method is performed.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method for interworking data between a plurality of blockchain networks, the method is performed by a computer device and comprises performing a first phase of a transaction by dividing steps of the transaction for recording data and performing a second phase of the transaction according to a result of performing the first phase, wherein performing the first phase comprises performing a first step of a first transaction for recording the data in a first blockchain network of a plurality of blockchain networks and requesting to perform a first step of a second transaction for recording the data in a second blockchain network of the plurality of blockchain networks.

According to another aspect of the inventive concept, there is provided a device for interworking data between a plurality of blockchain networks, the device comprises a memory for storing one or more instructions and a processor, wherein the processor, by executing the stored one or more instructions, performs a first phase of a transaction by dividing steps of the transaction for recording data and a second phase of the transaction according to a result of performing the first phase, wherein the first phase comprises performing a first step of a first transaction for recording the data in a first blockchain network of a plurality of blockchain networks and requesting to perform a first step of a second transaction for recording the data in a second blockchain network of the plurality of blockchain networks.

According to another aspect of the inventive concept, there is provided a computer program stored on a computer readable recording medium, the computer program is in combination with a computing device and causes to perform a first phase of a transaction by dividing steps of the transaction for recording data and perform a second phase of the transaction according to a result of performing the first phase, wherein performing the first phase comprises performing a first step of a first transaction for recording the data in a first blockchain network of a plurality of blockchain networks and requesting to perform a first step of a second transaction for recording the data in a second blockchain network of the plurality of blockchain networks.

BRIEF DESCRIPTION OF THE DRAWINGS

These and/or other aspects will become apparent and more readily appreciated from the following description of the embodiments, taken in conjunction with the accompanying drawings in which:

FIG. 2 is an exemplary configuration diagram illustrating a system for interworking data between a plurality of blockchain networks according to some embodiments of the present disclosure;

DETAILED DESCRIPTION

Figure 1:
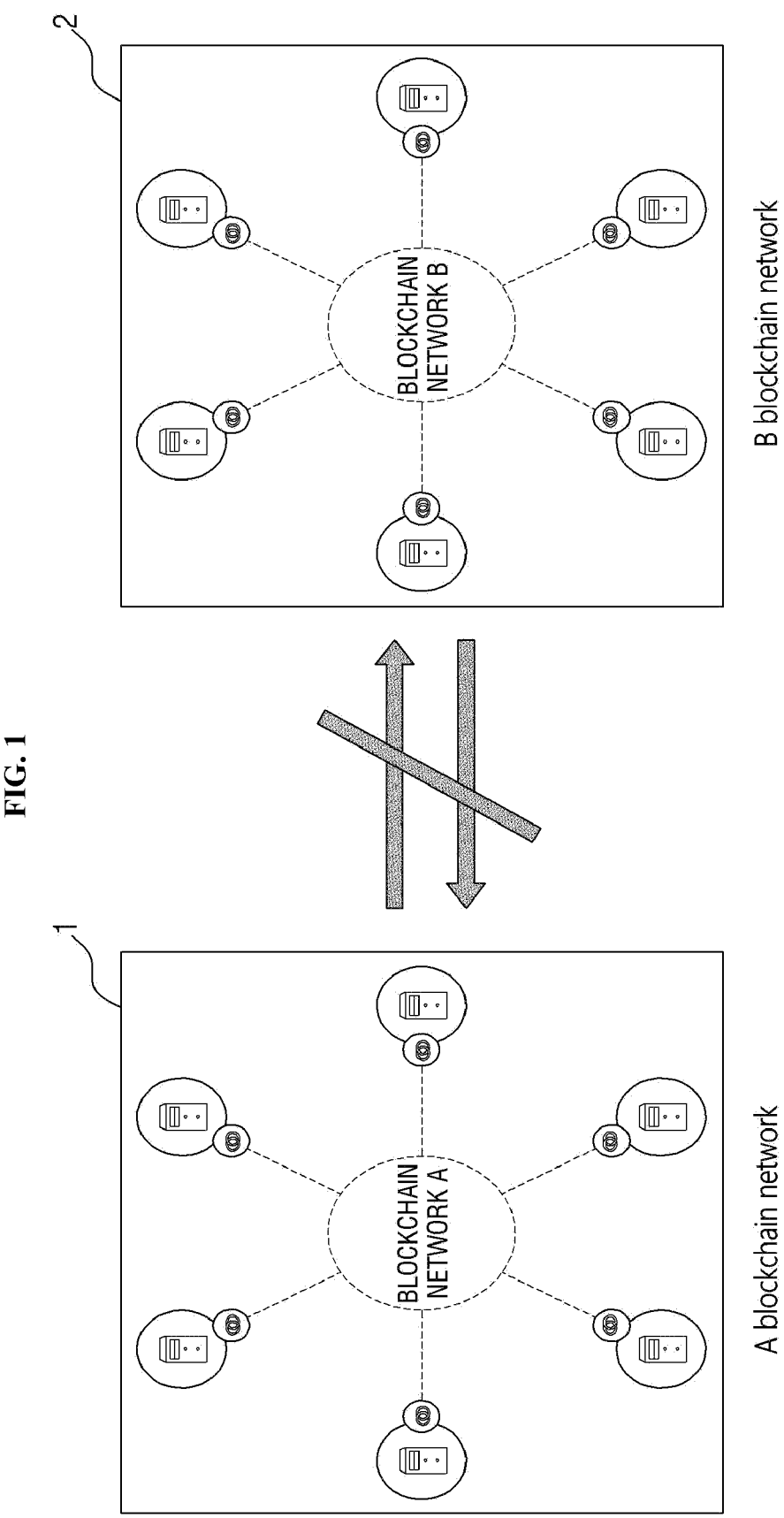
FIG. 1 is a conceptual diagram illustrating a problem in which data interworking between different blockchain networks is difficult in a conventional blockchain network environment.

Hereinafter, exemplary embodiments of the present disclosure will be described more fully with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

In describing components of the present disclosure, it is possible to use the terms such as first, second, A, B, (a), (b), etc. These terms are only intended to distinguish a component from another component, and a nature, an order, or a sequence is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Hereinafter, various embodiments of the present disclosure for solving the above-described technical problems will be described.

FIG. 2 is an exemplary configuration diagram illustrating a system environment in which a method for interworking data between a plurality of blockchain networks operates according to some embodiments of the present disclosure. Referring to FIG. 2, a system environment 1000 includes a first blockchain network 10, a second blockchain network 20, a first interworking device 100 connected with the first blockchain network 10, a second interworking device 200 connected to the second blockchain network 20, and a user terminal 300.

The first blockchain network 10 is any blockchain network formed by a plurality of blockchain nodes. The first blockchain network 10 may be a network that verifies its consistency through distributed consensus of blockchain nodes with respect to a transaction request, and records transaction data in a newly generated block according to a verification result. However, it is not limited thereto.

The second blockchain network 20 is also any blockchain network formed by a plurality of blockchain nodes. The second blockchain network 20 may also be a network that verifies its consistency through distributed consensus of blockchain nodes with respect to a transaction request, and records transaction data in a newly generated block according to a verification result. However, it is not limited thereto.

In an embodiment, the first blockchain network 10 and the second blockchain network 20 may be different types of blockchain networks. For example, the first blockchain network 10 and the second blockchain network 20 may be networks having different distribution sum algorithms, transaction architectures, or block generation algorithms. For example, the first blockchain network 10 may be a Hyperledger Fabric network, and the second blockchain network 20 may be an Ethereum network. However, it is not limited thereto.

The first interworking device 100 is a device connected to the first blockchain network 10 to execute a first transaction for the first blockchain network 10. The first interworking device 100 is a device that performs a series of operations for simultaneously recording data according to a transaction request to the first blockchain network 10 and the second blockchain network 20, in response to the transaction request received from the user terminal 300. To this end, the first interworking device 100 divides steps of the first transaction for data recording, and executes them sequentially. Specific methods and steps performed by the first interworking device 100 for data recording will be described in detail later with reference to FIG. 4, and thus description thereof will be omitted here.

The second interworking device 200 is a device connected to the second blockchain network 20 to execute a second transaction for the second blockchain network 20. In response to a request of the first interworking device 100, the second interworking device 200 executes a second transaction for the second blockchain network 20, and sends a result of executing the second transaction to the first interworking device 100 as a response. The second interworking device 200 may sequentially execute each of divided steps of the second transaction so that the second transaction is executed simultaneously with the first transaction. Here, each step of the second transaction may be executed sequentially by engaging with each step of the first transaction.

Here, although the first interworking device 100 and the second interworking device 200 are illustrated as separate devices, the scope of the present disclosure is not limited thereto. For example, the first interworking device 100 and the second interworking device 200 may be configured as one device, and the first transaction for the first blockchain network 10 and the second transaction for the second blockchain network 20 may be executed together through the one device.

The user terminal 300 is a device that receives a transaction processing service from the first interworking device 100. The user terminal 30 may be implemented as any one of a mobile phone, a smart phone, a laptop, a notebook, a desktop, a server, or a workstation, but is not limited thereto. The user terminal 300 and the first interworking device may communicate via a network. Here, the network may be implemented as any type of wired/wireless network such as a local area network (LAN), a wide area network (WAN), a mobile radio communication network, a wireless broadband Internet (Wibro), or the like.

Figure 3:
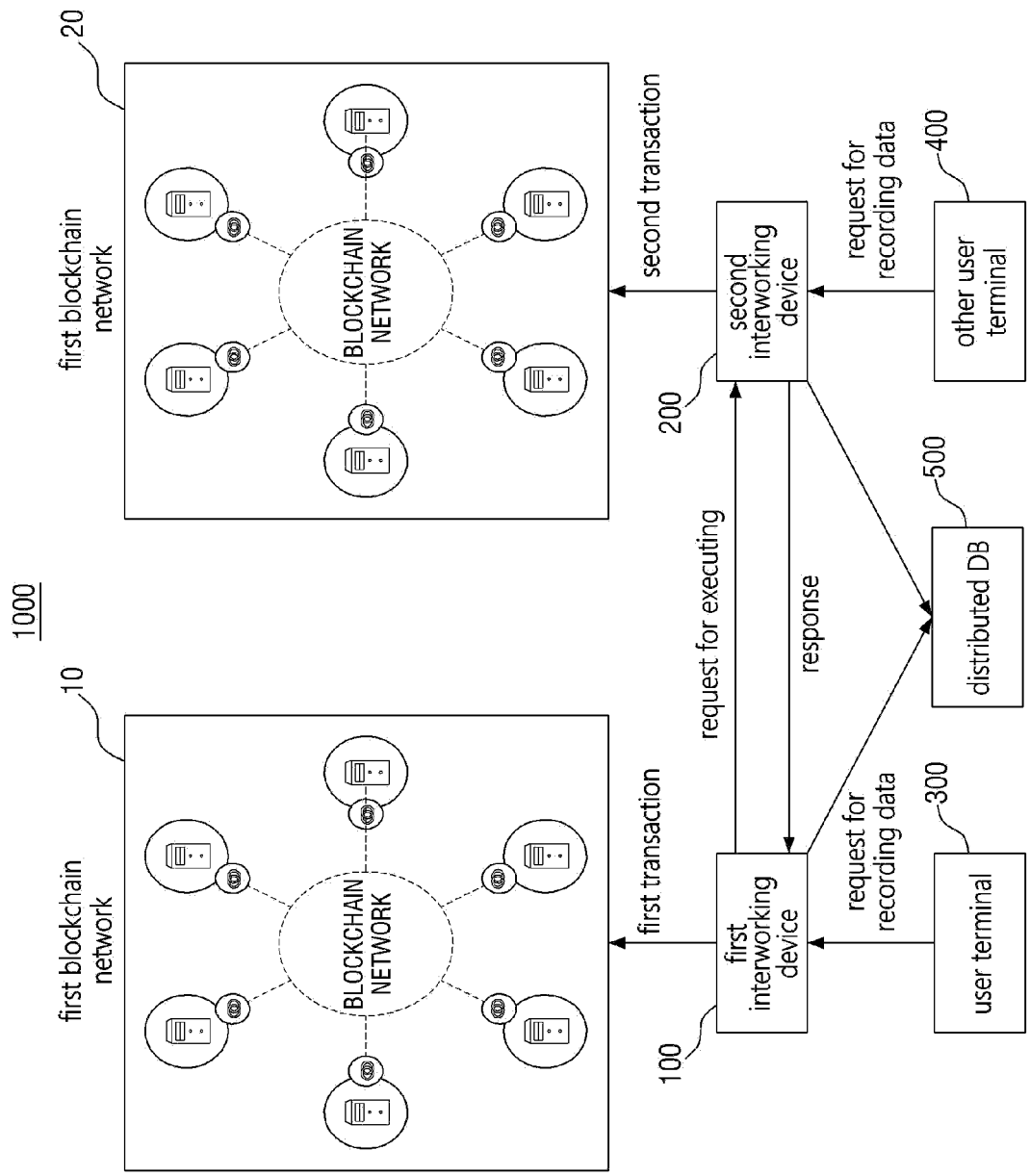
FIG. 3 is an exemplary configuration diagram illustrating an embodiment in which a distributed database 500 is added to an embodiment of FIG. 2.

FIG. 3 is an exemplary configuration diagram illustrating an embodiment in which a distributed database 500 is added to an embodiment of FIG. 2. A system environment 1010 illustrated in FIG. 3 is similar in most configurations to the system environment 1000 of FIG. 2. However, there is a difference in that the distributed database 500 for backing up data in association with the first interworking device 100 and the second interworking device 200 is further included.

The distributed database 500 is a storage for storing a backup of data recorded in the first blockchain network 10 or the second blockchain network 20 by the first interworking device 100 or the second interworking device 200. This makes it possible to preserve the original data even in a situation where the first blockchain network 10 or the second blockchain network 20 becomes unavailable when data to be recorded is important data. Alternatively, the distributed database 500 stores the original data before data is recorded in the first or second blockchain networks 10 and 20, so that the data recorded on the blockchain networks 10 and 20 may be referenced later to verify its integrity. Alternatively, the distributed database 500 may function as a data storage means in which the first interworking device 100 and the second interworking device 200 may temporarily store data according to their needs.

In an embodiment, the distributed database 500 may be a distributed key-value store, such as ETCD.

In an embodiment, the distributed database 500 may be provided to ensure that transactions in accordance with the present disclosure are executed in the same order on the first and second blockchain networks 10 and 20.

In an embodiment, the distributed database 500 may be provided for crash fault tolerance (CFT). CFT is an operation that enables a service in the rest of the system even if a node is troubled by an abnormal collision in a distributed system, and the distributed database 500 may be provided as one component of such a distributed system.

Another user terminal 400 illustrated in FIG. 3 is a device that receives a transaction service from the second interworking device 200, and is essentially the same as the user terminal 300. Another user terminal 400 has a relationship in which the first interworking device 100 and the second interworking device 200 do not depend on each other, but are equal to each other. It is shown to indicate that each one is in a parallel position, which may be either a master device or a slave device, according to a situation to process a transaction. In other words, in an embodiment of FIG. 2, the first interworking device 100 may send a request to execute the second transaction to the second interworking device 200 by a request of the user terminal 300. Complementary to this, in an embodiment of FIG. 3, the second interworking device 200 may send a request to execute the first transaction to the first interworking device 100 by a request of another user terminal 400.

Figure 4:
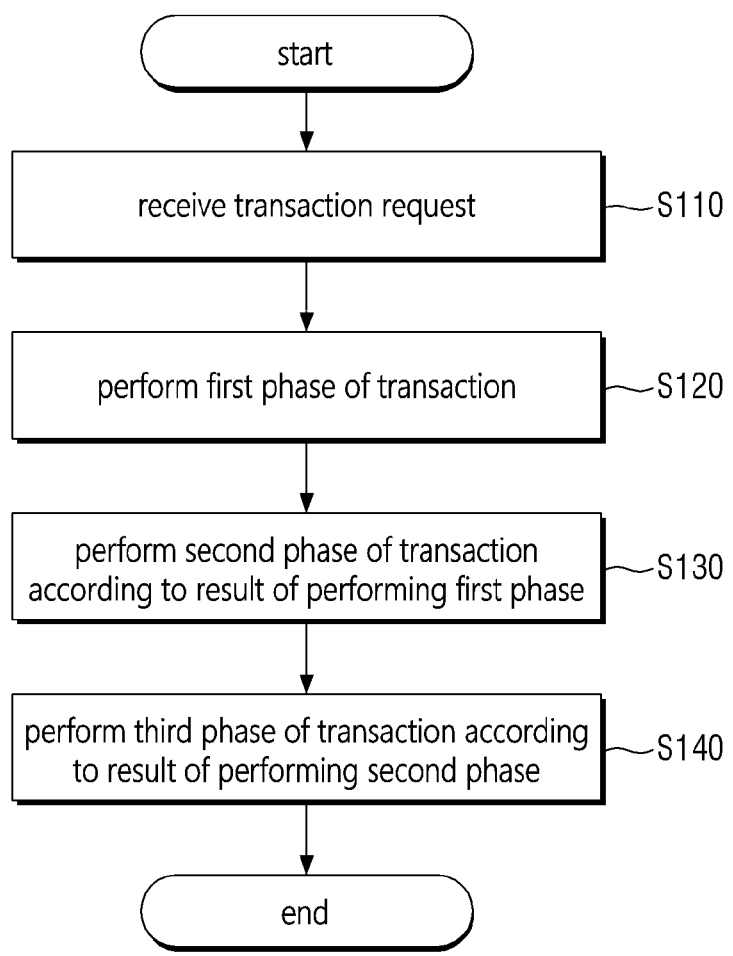
FIG. 4 is a flowchart illustrating a method for interworking data between a plurality of blockchain networks according to some embodiments of the present disclosure.

FIG. 4 is a flowchart illustrating a method for interworking data between a plurality of blockchain networks according to some embodiments of the present disclosure. Referring to FIG. 4, a method according to the present embodiment includes steps S110 to S140.

For convenience of understanding, it is assumed that the method for interworking data is performed in the system environments 1000 and 1010 illustrated in FIG. 2 or 3. When the subject of each operation is omitted in the description of the present embodiment, it is assumed that it is performed by the first interworking device 100 described above. In addition, naturally, in the method of interworking data according to the present embodiment, an execution order of each operation may be changed within a range in which the execution order may be logically changed as necessary.

FIGS. 5 to 8 are diagrams illustrating each step of FIG. 4 in more detail. Therefore, while describing each step of FIG. 4, each step will be described with reference to the drawings of FIGS. 5 to 8 for better understanding.

In step S110, the first interworking device 100 receives a transaction request or an inquiry request for a transaction status from the user terminal 300.

Here, the requested transaction may be stored in a work queue, and the transaction stored in the queue may be performed after another transaction in progress is completed. In an embodiment, the work queue may be stored or backed up in the distributed database 500.

In step S120, the first interworking device 100 divides steps of the transaction for data recording and performs a first phase among them so as to simultaneously record data according to the requested transaction to the first blockchain network 10 and the second blockchain network 20.

Figure 5:
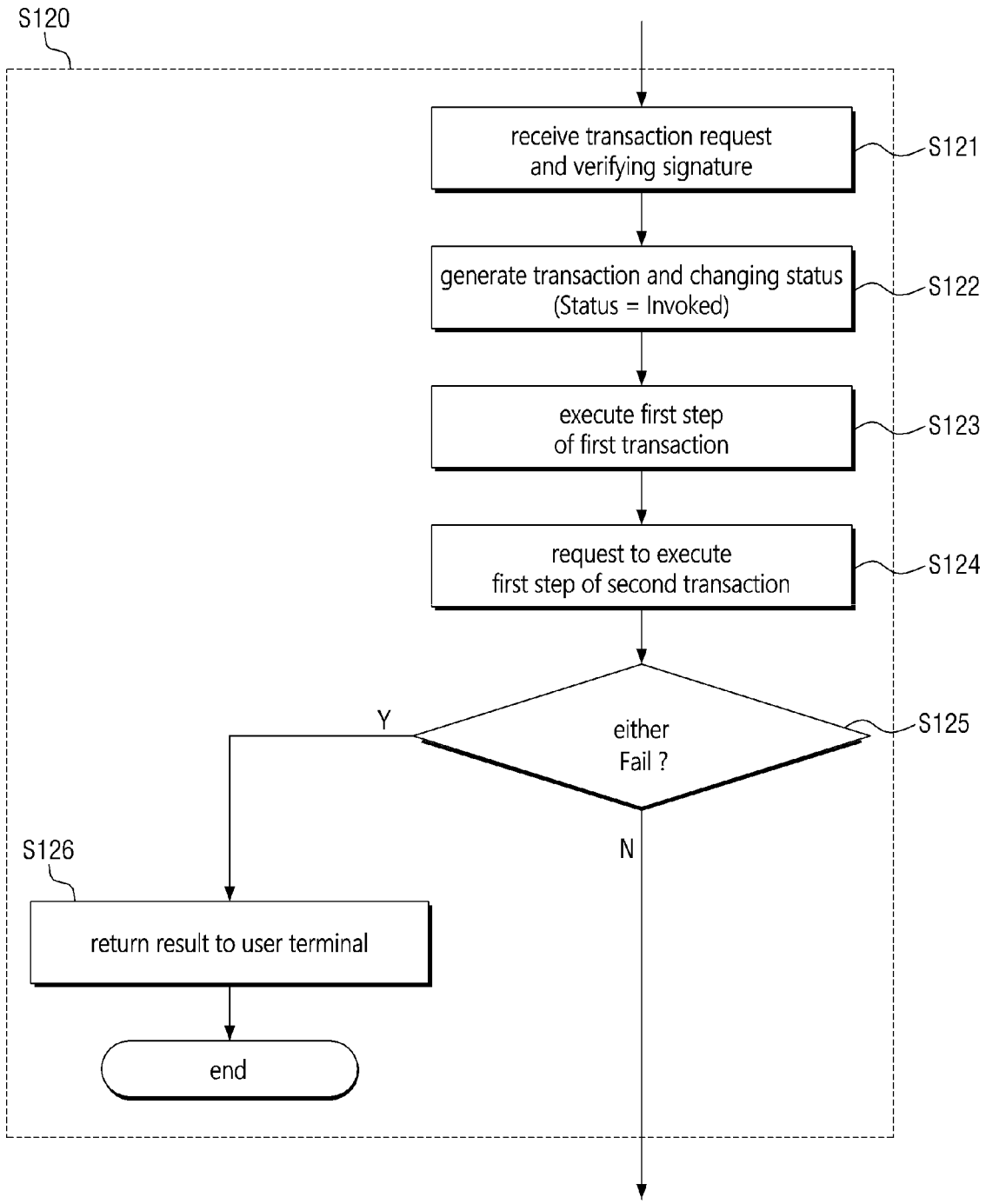
FIG. 5 is a flowchart illustrating an embodiment in which step S120 of an embodiment illustrated in FIG. 4 is specified.

With reference to FIG. 5 with respect to step S120 in more detail, in step S121, the first interworking device 100 receives a transaction request from the user terminal 300 and verifies a signature with respect to the user terminal 300.

In step S122, the first interworking device 100 generates a transaction according to the transaction request, and changes transaction status information to an invoked status.

In step S123, the first interworking device 100 executes a first step of steps of a first transaction for recording data in the first blockchain network 10 according to the transaction request. In an embodiment, the first step may be a proposal step of transferring to the first blockchain network 10 that a transaction is to be progressed.

After the first step of the first transaction is completed, in step S124, the first interworking device 100 requests the second interworking device 200 to execute a first step of a second transaction. The first interworking device 100 may receive a response from the second interworking device 200 for a result of executing the first step of the second transaction. In an embodiment, the first step of the second transaction may be a first signature step of multi-sig steps of the second transaction.

In step S125, the first interworking device 100 determines whether any one of the first step of the first transaction and the first step of the second transaction has failed. If either fails, since it failed to record a requested data in the first blockchain network 10 and the second blockchain network 20 at the same time, the present embodiment proceeds to step S126, and it returns a result indicating that the user terminal 300 transaction has failed and ends.

On the other hand, if both of the first step of the first transaction and the first step of the second transaction are successful, it proceeds to the next step to continue the transaction.

Returning to FIG. 4 again, step S130 proceeds as the next step.

Figure 6:
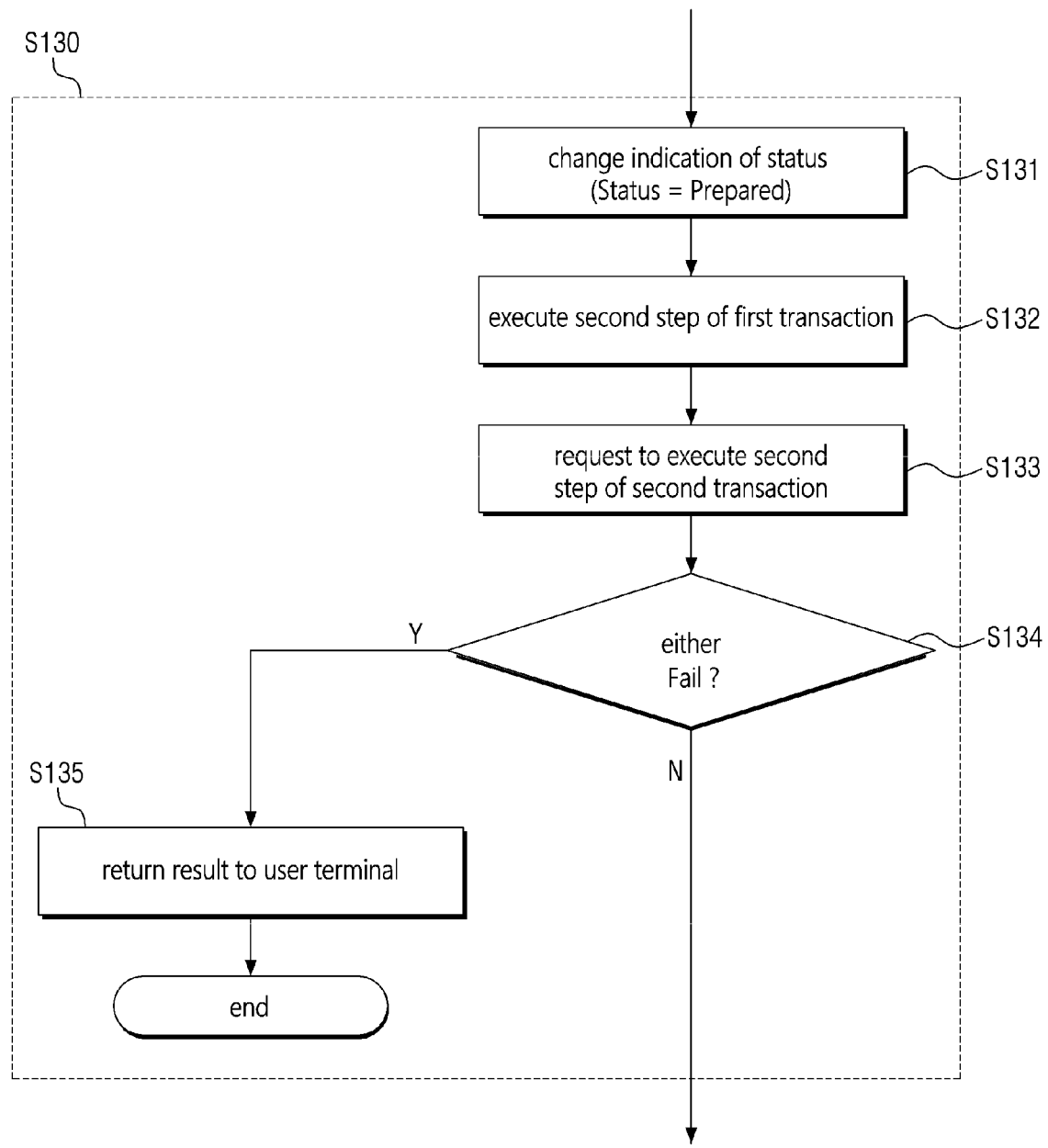
FIG. 6 is a flowchart illustrating an embodiment in which step S130 of an embodiment illustrated in FIG. 4 is specified.

In step S130, the first interworking device 100 performs a second phase of the transaction. Referring to FIG. 6 for a detailed description of step S130, in step S131, the first interworking device 100 changes status information of the transaction to a prepared status to indicate that the transaction has proceeded to the second phase.

In step S132, the first interworking device 100 executes a second step of steps of the first transaction for recording data in the first blockchain network 10 according to the transaction request. In an embodiment, the second step may be a submission step of transferring data to be recorded through a transaction to the first blockchain network 10.

After the second step of the first transaction is completed, in step S133, the first interworking device 100 requests the second interworking device 200 to execute a second step of the second transaction. The first interworking device 100 may receive a response from the second interworking device 200 for a result of executing the second step of the second transaction. In an embodiment, the second step of the second transaction may be a second signature step of the multi-sig steps of the second transaction.

In step S134, the first interworking device 100 determines whether any one of the second step of the first transaction and the second step of the second transaction has failed. If either fails, similar to the first phase, since it failed to record a requested data in the first blockchain network 10 and the second blockchain network 20 at the same time, the present embodiment proceeds to step S135, and it returns a result indicating that the user terminal 300 transaction has failed and ends.

On the other hand, if both of the second step of the first transaction and the second step of the second transaction are successful, it proceeds to the next step to continue the transaction.

Returning to FIG. 4 again, step S140 proceeds as the next step.

In step S140, the first interworking device 100 performs the second phase of the transaction, and performs an action for matching data records according to a result of performing a third phase.

Figure 7:
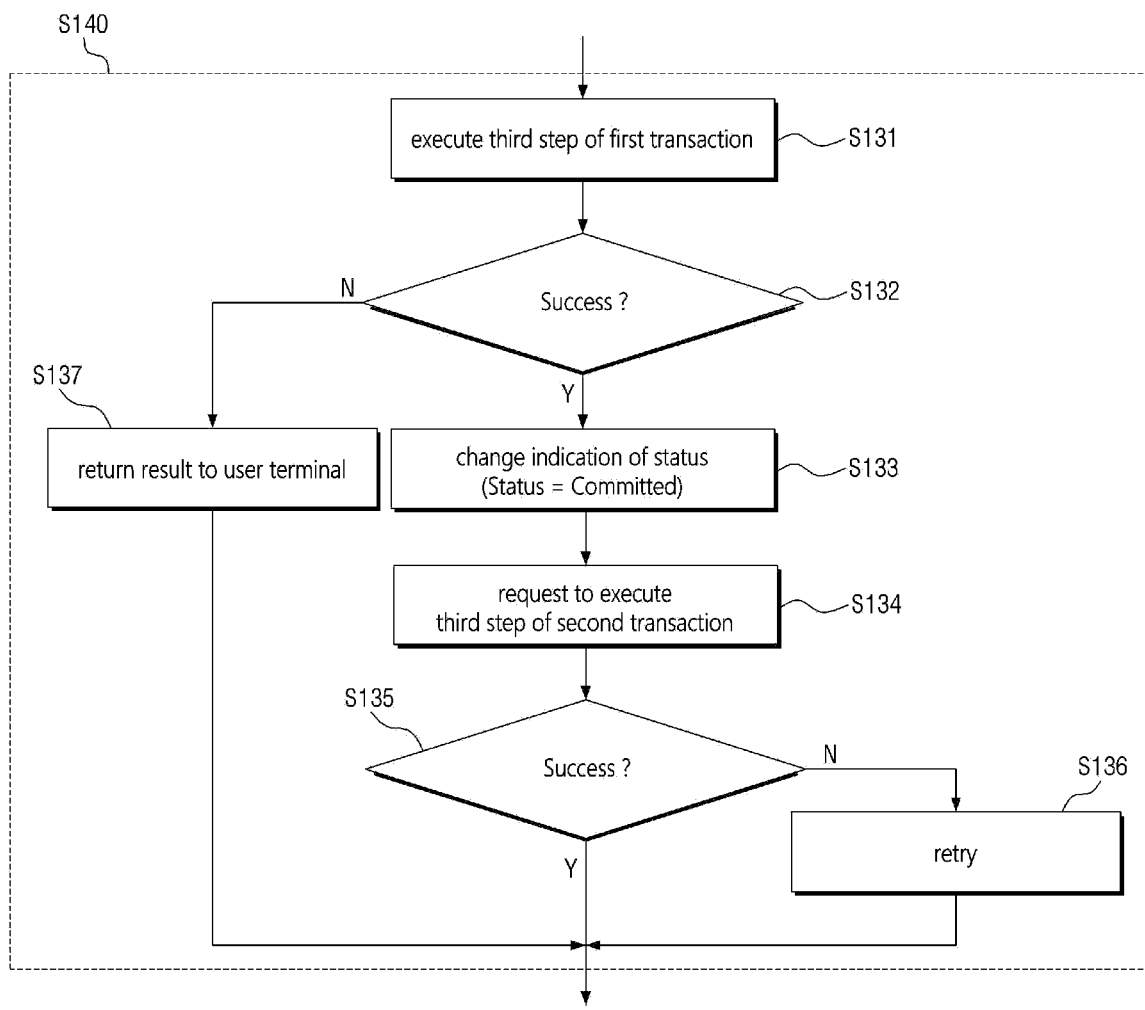
FIG. 7 is a flowchart illustrating an embodiment in which step S140 of an embodiment of FIG. 4 is specified.

Referring to FIG. 7 for a detailed description of step S140, in step S141, the first interworking device 100 changes the status information of the transaction to a committed status to indicate that the transaction has proceeded to the third phase.

In step S142, the first interworking device 100 executes a third step of the steps of the first transaction for recording data in the first blockchain network 10 according to the transaction request. In an embodiment, the third step may be a committed step of actually recording data to be recorded through the transaction on a block of the first blockchain network 10 as a final step of the first transaction.

After the third step of the first transaction is completed, in step S143, the first interworking device 100 determines whether the third step of the first transaction has been executed successfully. If it is successfully executed and data is normally recorded in the first blockchain network 10, the embodiment proceeds to step S144. Otherwise, the embodiment proceeds to step S147, and returns a result indicating that the transaction has failed to the user terminal and ends.

In step S144, the first interworking device 100 requests the second interworking device 200 to execute a third step of the second transaction. The first interworking device 100 may receive a response from the second interworking device 200 for a result of executing the third step of the second transaction. In an embodiment, the third step of the second transaction may be a last signature step of the multi-sig steps of the second transaction.

In step S145, the first interworking device 100 determines whether the third step of the second transaction has been executed successfully. If it is successfully executed, since the recording of data according to the requested transaction was successfully performed on both the first blockchain network 10 and the second blockchain network 20, it returns a result to the user terminal 300 and terminates as it is.

On the other hand, if it has not been executed successfully (that is, failed), the present embodiment proceeds to step S146, and the first interworking device 100 performs an additional action for matching data records between the first blockchain network 10 and the second blockchain network 20. In other words, in this case, since the data was successfully recorded in the first blockchain network 10, but the data was not recorded in the second blockchain network 20, data inconsistency occurs between the first blockchain network 10 and the second blockchain network 20. In order to correct such an inconsistency status, the first interworking device 100 may retry data recording repeatedly until data recording succeeds in the second blockchain network 20.

In an embodiment, in order to correct the inconsistency status, the first interworking device 100 may first retry data recording to the second blockchain network 20 and queue the next transaction to proceed afterwards until a transaction for retrying the recording is successful, thereby preventing the integrity of blockchain data from breaking and resolving the data inconsistency.

When the inconsistency status is resolved by step S146, a result reply thereof is transmitted to the user terminal 300, and the present embodiment ends.

According to the embodiments of the present invention described above, a method for interworking data between blockchain networks without providing a separate hub network is provided. Accordingly, it is possible to interwork data between a plurality of blockchain networks without the risk of data leakage.

Further, according to the embodiments of the present invention described above, steps of transactions for recording data in a plurality of blockchain networks are divided and executed, and the divided steps of each transaction are engaged with each other and sequentially executed. Accordingly, a time point at which the data is recorded in the plurality of blockchain networks is almost the same, thereby ensuring the concurrency of data recording.

In addition, according to the embodiments of the present invention, when the data is recorded in only one of the plurality of blockchain networks as a result of the transaction, it is possible to resolve the data inconsistency status through an additional action to correct this. Accordingly, it is possible to ensure the consistency of data between the plurality of blockchain networks.

Figure 8:
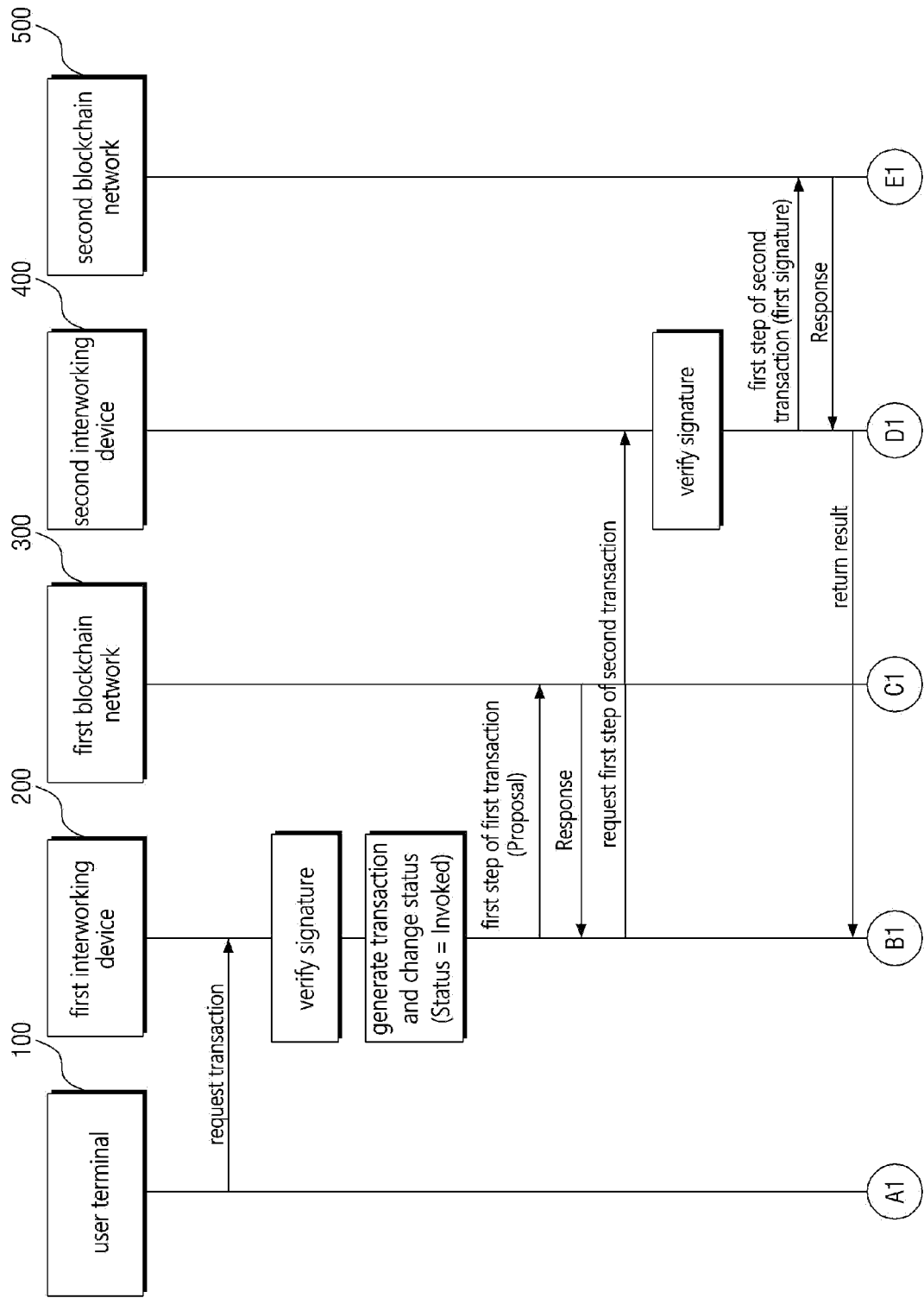
FIGS. 8 to 10 are exemplary flowcharts illustrating a method for interworking data between a plurality of blockchain networks according to some embodiments of the present disclosure as a series of processes by a plurality of interworking device.
Figure 9:
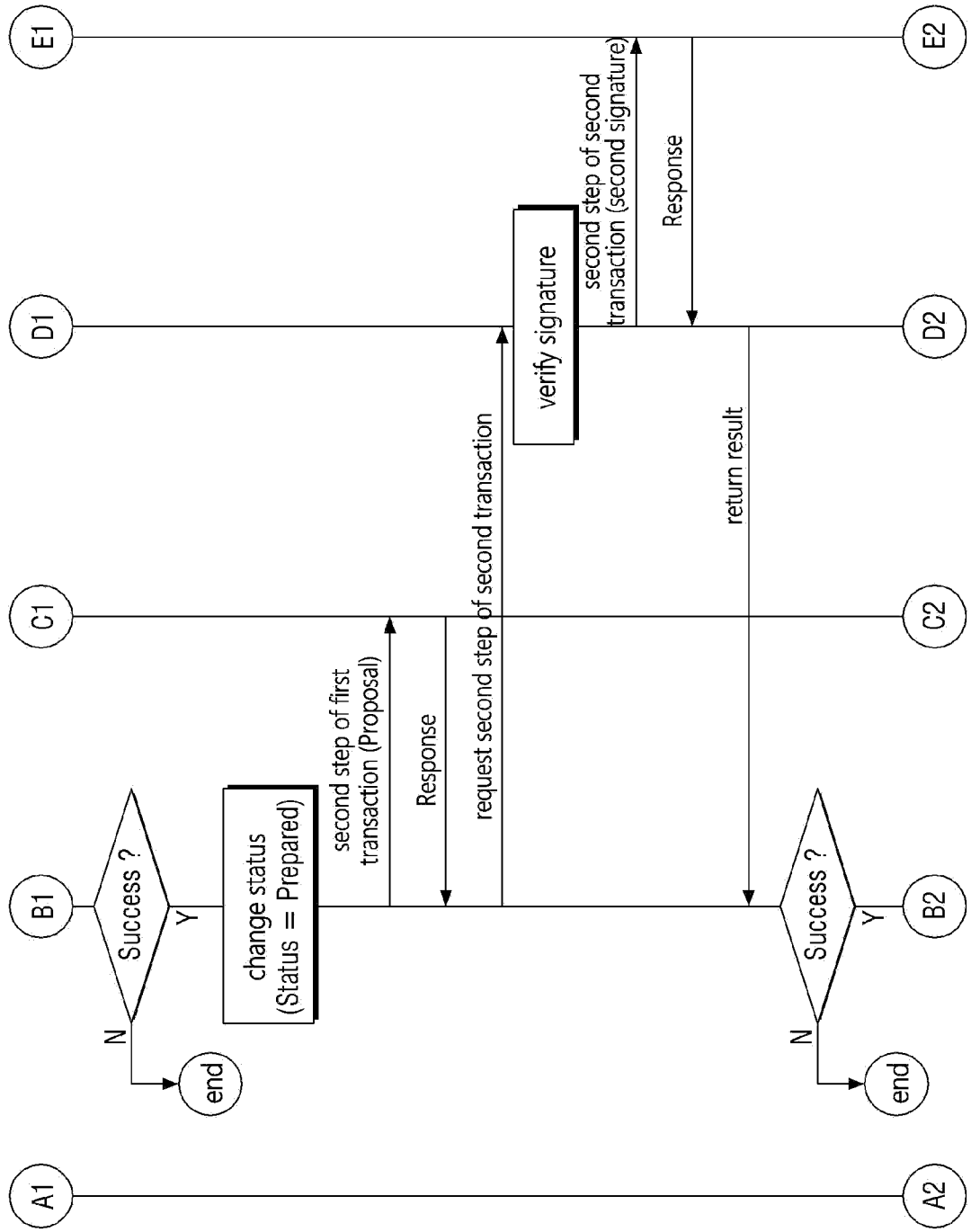
Figure 10:
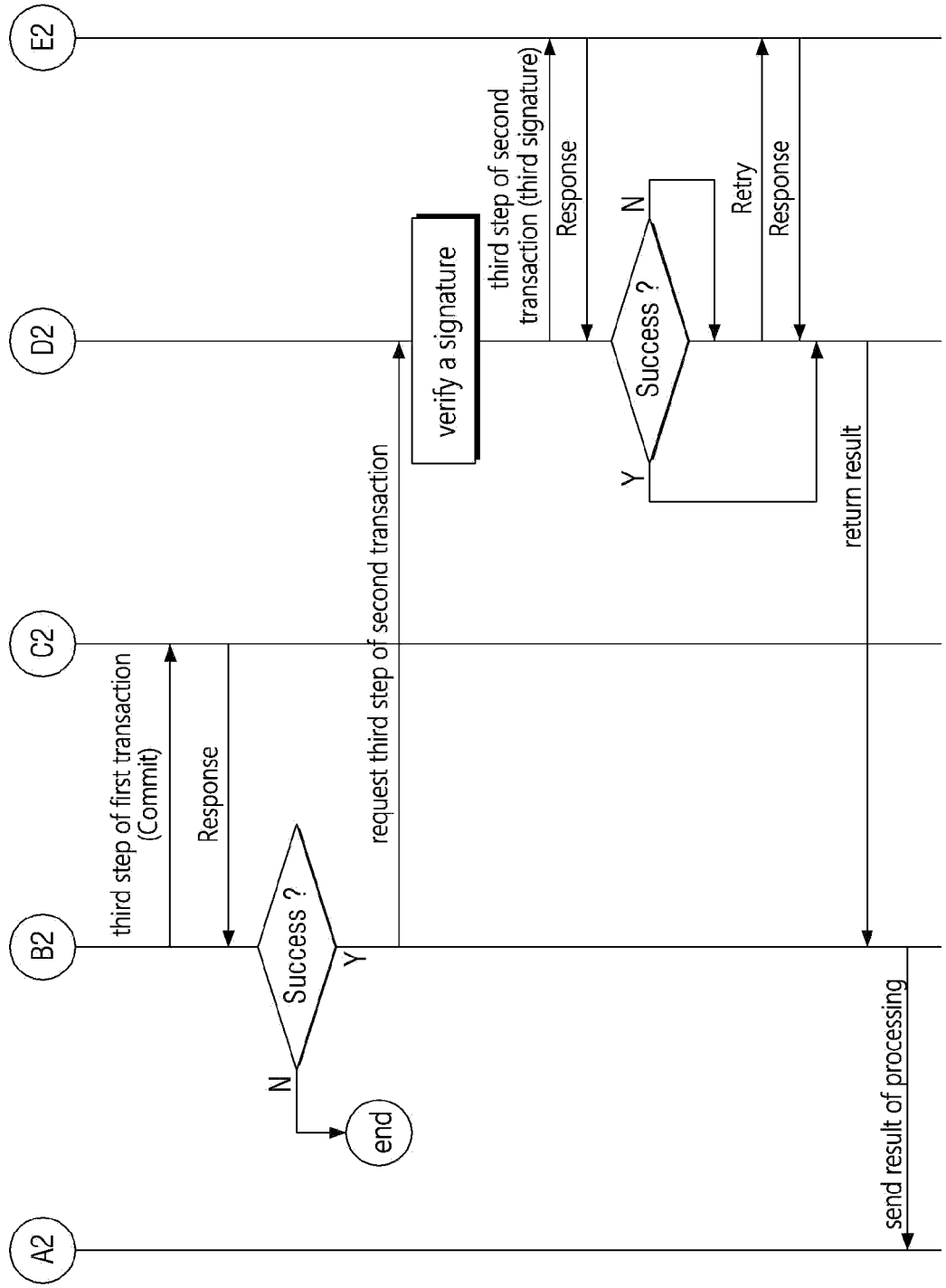

FIGS. 8 to 10 are exemplary flowcharts illustrating a method for interworking data between a plurality of blockchain networks according to some embodiments of the present disclosure described above from a process perspective by a plurality of interworking devices. Referring to FIGS. 8 to 10, a flow of a sequential process performed among the user terminal 300, the first interworking device 100, the first blockchain network 10, the second interworking device 200, and the second blockchain network 20 is shown.

In the description of FIGS. 8 to 10, duplicates from the foregoing or descriptions for the same term may be omitted for brevity of description.

First, referring to FIG. 8, the user terminal 300 sends a transaction request to the first interworking device 100. In response to receiving the transaction request, the first interworking device 100 verifies a signature for the user terminal 300 and generates a transaction according to the transaction request if it is determined that the signature is normal. Then, it changes a transaction status to an invoked status to indicate proceeding to the first step of the first transaction.

Subsequently, the first interworking device 100 executes the first step of the first transaction to record data in the first blockchain network 10 according to the transaction request. Here, the first step of the first transaction may be a proposal step.

After receiving a response from the first blockchain network 10, it sends a request to the second interworking device 200 to execute a first step of a second transaction.

In response to the request, the second interworking device 200 verifies the signature for the first interworking device 100 and executes the first step of the second transaction if it is determined that the signature is normal. Here, the first step of the second transaction may be a first signature step of multi-sig steps. Then, the second interworking device 200 receives a response from the second blockchain network 10 and returns a result thereof to the first interworking device 100.

Subsequently, with reference to FIG. 9, the first interworking device 100 determines whether both the first step of the first transaction and the first step of the second transaction are performed successfully. If either fails, a reply for a transaction failure is sent to the user terminal 300 and the present embodiment ends as it is. If both are successfully performed, it proceeds to the next, and the first interworking device 100 changes the transaction status to a prepared status. Then, it executes a second step of the first transaction. Here, the second step of the first transaction may be a submission step.

Then, after receiving a response from the first blockchain network 10, it sends a request to the second interworking device 200 to execute a second step of the second transaction.

In response to the request, the second interworking device 200 verifies the signature for the first interworking device 100 and executes the second step of the second transaction if it is determined that the signature is normal. Here, the second step of the second transaction may be a second signature step of the multi-sig steps. Then, the second interworking device 200 receives a response from the second blockchain network 10 and returns a result thereof to the first interworking device 100.

The first interworking device 100 determines whether both the second step of the first transaction and the second step of the second transaction have been successfully performed with reference to the reply. If either fails, a reply for a transaction failure is sent to the user terminal 300 and the present embodiment ends as it is. If both are successful, it proceeds to the next.

Subsequently, a description will be given with reference to FIG. 10. The first interworking device 100 executes a third step of the first transaction as a final step of a transaction for recording data in the first blockchain network 10. Here, the third step of the first transaction may be a committed step.

Then, after receiving a response from the first blockchain network 10, it is determined whether the third step of the first transaction has been successfully performed. If it is not successfully performed, a reply for a transaction failure is sent to the user terminal 300 and the present embodiment ends as it is. If it is successfully performed, a request for executing a third step of the second transaction is transmitted to the second interworking device 200 such that data is also recorded in the second blockchain network 20 in the same manner as that recorded in the first blockchain network 10.

In response to the request, the second interworking device 200 verifies the signature for the first interworking device 100 and executes the third step of the second transaction if it is determined that the signature is normal. Here, the third step of the second transaction may be a last signature step of the multi-sig steps. Then, the second interworking device 200 receives a response from the second blockchain network 10.

In an embodiment, if a response from the second blockchain network 10 is received and it is determined that the third step of the second transaction has not been performed successfully, the second interworking device 200 may retry the third step of the second transaction repeatedly. In other words, the first interworking device 100 may predominantly perform the determination and the execution of the retry of the third step of the second transaction as in an embodiment of FIG. 8, and the second interworking device 200 may perform it by itself as in an embodiment of FIG. 11.

In an embodiment, if the second interworking device 200 performs the retry up to a predetermined number of times and the data recording is not successful (in other words, if the third step of the second transaction continues to fail), a failure result may be returned to the first interworking device 100 without further retrying.

On the other hand, if the third step of the second transaction is successful, the second interworking device 200 returns a processing result thereof to the first interworking device 100.

The first interworking device 100 receives the processing result from the second interworking device 200, and accordingly, sends a final processing result to the user terminal 300.

In the following, an example computing device that may implement a device according to various embodiments of the present disclosure will be described with reference to FIG. 11.

Figure 11:
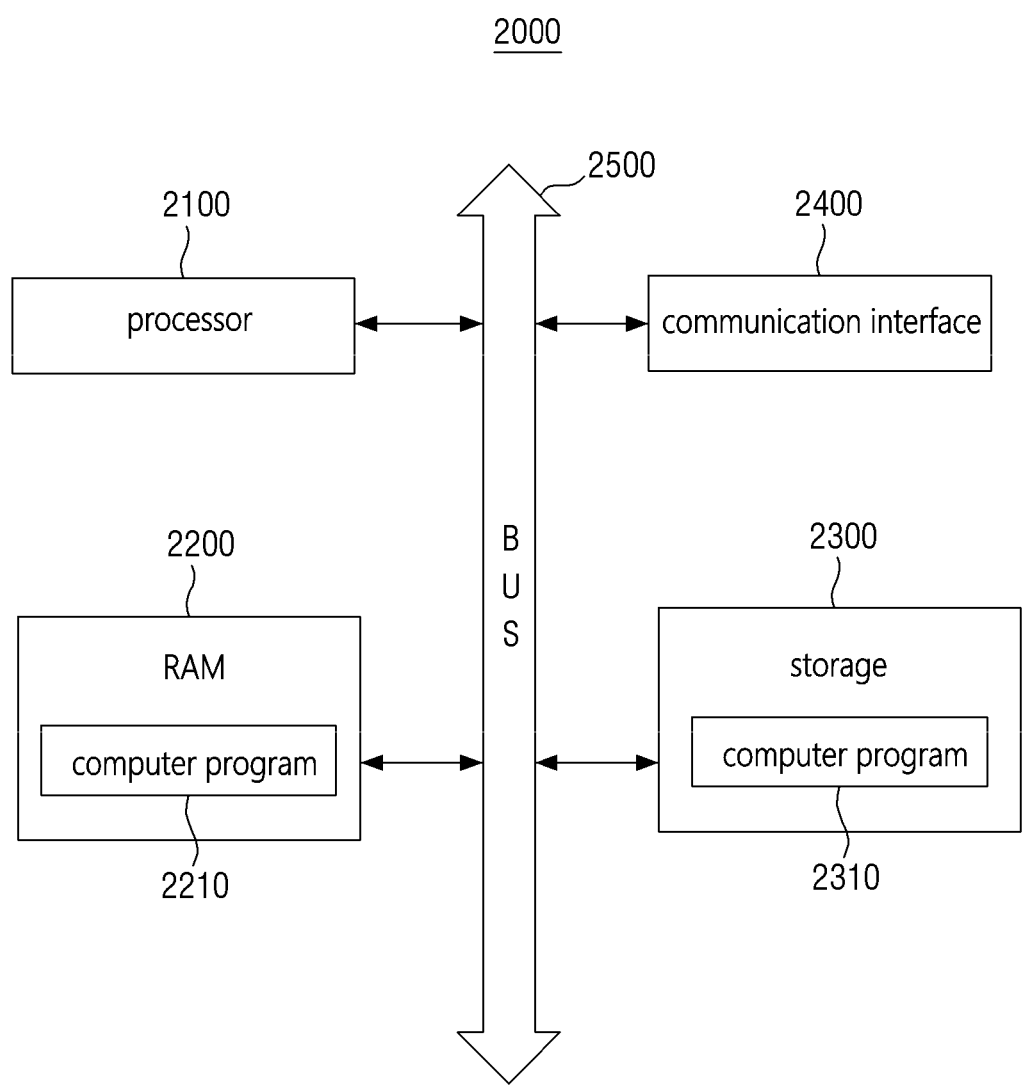
FIG. 11 illustrates an example computing device that may implement devices in accordance with various embodiments of the present disclosure.

FIG. 11 is a hardware diagram illustrating a computing device 2000. As shown in FIG. 11, the computing device 2000 may include one or more processors 2100, a memory 2200 for loading a computer program executed by the processor 2100, a bus 2500, a communication interface 2400, and a storage 2300 for storing a computer program 2310. FIG. 11 illustrates only the components related to the embodiments of the present disclosure. Accordingly, it will be appreciated by those skilled in the art that it may further include other general purpose components in addition to the components illustrated in FIG. 11.

The processor 2100 controls the overall operation of each component of the computing device 2000. The processor 3100 may include a central processing unit (CPU), a microprocessor unit (MPU), a micro controller unit (MCU), a graphics processing unit (GPU), or any type of processor well known in the art. In addition, the processor 2100 may perform an operation on at least one application or program for executing a method/operation according to the embodiments of the present disclosure. The computing device 2000 may have one or more processors.

The memory 2200 stores various data, commands, and/or information. The memory 2200 may load one or more programs 2310 from the storage 2300 to execute a method/operation according to various embodiments of the present disclosure. The memory 2200 may be implemented as a volatile memory such as a RAM, but the technical scope of the present disclosure is not limited thereto.

The bus 2500 provides communication between components of the computing device 2000. The bus 2500 may be implemented as various types of buses such as an address bus, a data bus, a control bus, or the like.

The communication interface 2400 supports wired and wireless Internet communication of the computing device 2000. In addition, the communication interface 2400 may support various communication methods other than the Internet communication. To this end, the communication interface 2400 may comprise a communication module well known in the art. In some cases, the communication interface 2400 may be omitted.

The storage 2300 may non-temporarily store one or more computer programs 2310 or various data. The storage 140 may be configured to include a non-volatile memory such as a read only memory (ROM), an erasable programmable ROM (EPROM), an electrically erasable programmable ROM (EEPROM), or a flash memory, a hard disk, a removable disk, or any form of computer readable recording medium well known in the art to which the present disclosure belongs.

The computer program 2310 may include one or more instructions that, when loaded into memory 2200, cause the processor 2100 to perform methods/operations according to various embodiments of the present disclosure. In other words, the processor 2100 may perform the methods/operations according to various embodiments of the present disclosure by executing the one or more instructions.

For example, the computer program 2310 may include instructions to perform an operation for inquiring a transaction status, an operation for performing a first phase of a transaction by dividing steps of the transaction for data recording, an operation for performing a second phase of the transaction according to an execution result of the first phase, an operation for performing a third phase of the transaction according to an execution result of the second phase, and an operation for performing an action to match data records according to the execution result of the third phase.

Until now, various embodiments of the present disclosure and effects of the embodiments have been described with reference to FIGS. 1 through 11. However, the effects of the technical spirit of the present disclosure are not restricted to the one set forth herein. The above and other effects of the embodiments will become more apparent to one of daily skill in the art to which the embodiments pertain by referencing the claims.

The technical spirit of the present disclosure described above with reference to FIGS. 1 through 11 can be implemented in computer-readable code on a computer-readable medium. The computer-readable recording medium may be, for example, a removable recording medium (a compact disc (CD), a digital versatile disc (DVD), a Blu-ray disc, a universal serial bus (USB) storage device or a portable hard disk) or a fixed recording medium (a ROM, a RAM or a computer-equipped hard disk).

The computer program recorded on the computer-readable recording medium may be transmitted to another computing device via a network such as the Internet and installed in the computing device, and thus can be used in the computing device.

Although it has been mentioned that all components configuring the embodiments of the present disclosure described hereinabove are combined with each other as one component or are combined and operated with each other as one component, the present disclosure is not necessarily limited to the above-mentioned embodiments. That is, all the components may also be selectively combined and operated with each other as one or more components without departing from the scope of the present disclosure.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. The exemplary embodiments should be considered in a descriptive sense only and not for purposes of limitation. Therefore, the scope of the present disclosure is defined not by the detailed description of the present disclosure but by the following claims, and all differences within the scope will be construed as being included in the present disclosure.

What is claimed is:

1. A method for interworking data between a plurality of blockchain networks, the method being performed by a computer device, and comprising:
   performing a first phase of a transaction by dividing steps of the transaction for recording data; and
   performing a second phase of the transaction according to a result of performing the first phase,
   wherein the performing of the first phase comprises:
   performing a first step of a first transaction for recording the data in a first blockchain network of a plurality of blockchain networks;
   requesting to perform a first step of a second transaction for recording the data in a second blockchain network of the plurality of blockchain networks;

receiving a response for a result of performing the first step of the second transaction; and determining whether any one of the first step of the first transaction and the first step of the second transaction has failed, wherein the second phase of the transaction is performed only if both of the first step of the first transaction and the first step of the second transaction are successful, wherein if any one of the first step of the first transaction and the first step of the second transaction has failed, neither of the first transaction nor the second transaction records the data in the first blockchain network or the second blockchain network.

2. The method of claim 1, wherein the performing of the second phase comprises:

performing a second step of the first transaction for recording the data in the first blockchain network of the plurality of blockchain networks; and requesting to perform a second step of the second transaction for recording the data in the second blockchain network of the plurality of blockchain networks.

3. The method of claim 1, wherein the first step of the first transaction, the first step of the second transaction, the second step of the first transaction, and the second step of the second transaction are engaged with each other and sequentially performed.

4. The method of claim 1, wherein an action for matching data records between the first blockchain network and the second blockchain network is performed according to a result of performing the second phase.

5. The method of claim 4, wherein the action for matching the data records comprises iteratively retrying at least some steps of the second transaction.

6. The method of claim 5, wherein the action for matching the data records comprises queuing the next transaction until the retry for the at least some steps of the second transaction is successful.

7. The method of claim 1, wherein the first transaction is performed by a first device connected with the first blockchain network;

the second transaction is performed by a second device connected with the second blockchain network; and a request to perform the first step of the second transaction is sent from the first device to the second device.

8. The method of claim 1, further comprising:

storing a task for a transaction for recording the data in a queue; and performing the task for the transaction for recording the data stored in the queue when there is no other transaction in progress.

9. The method of claim 1, further comprising:

storing the data in an external database.

10. The method of claim 9, wherein the external database is provided for causing a transaction for recording the data to be executed in the same order on the first blockchain network and the second blockchain network.

11. The method of claim 9, wherein the external database is provided for crash fault tolerance (CFT).

12. A device for interworking data between a plurality of blockchain networks, comprising:

a memory for storing one or more instructions; and a processor, wherein the processor, by executing the stored one or more instructions, performs:

a first phase of a transaction by dividing steps of the transaction for recording data; and a second phase of the transaction according to a result of performing the first phase; and wherein the first phase comprises:

performing a first step of a first transaction for recording the data in a first blockchain network of a plurality of blockchain networks;

requesting to perform a first step of a second transaction for recording the data in a second blockchain network of the plurality of blockchain networks;

receiving a response for a result of performing the first step of the second transaction; and determining whether any one of the first step of the first transaction and the first step of the second transaction has failed, wherein the second phase of the transaction is performed only if both of the first step of the first transaction and the first step of the second transaction are successful, wherein if any one of the first step of the first transaction and the first step of the second transaction has failed, neither of the first transaction nor the second transaction records the data in the first blockchain network or the second blockchain network.

13. The device of claim 12, wherein the processor performs an action for matching data records between the first blockchain network and the second blockchain network according to a result of performing the second phase.

14. A computer program stored on a non-transitory computer readable recording medium, the computer program being in combination with a computing device, and causing to:

perform a first phase of a transaction by dividing steps of the transaction for recording data; and perform a second phase of the transaction according to a result of performing the first phase, wherein the performing of the first phase comprises:

performing a first step of a first transaction for recording the data in a first blockchain network of a plurality of blockchain networks;

requesting to perform a first step of a second transaction for recording the data in a second blockchain network of the plurality of blockchain networks;

receiving a response for a result of performing the first step of the second transaction; and determining whether any one of the first step of the first transaction and the first step of the second transaction has failed, wherein the second phase of the transaction is performed only if both of the first step of the first transaction and the first step of the second transaction are successful, wherein if any one of the first step of the first transaction and the first step of the second transaction has failed, neither of the first transaction nor the second transaction records the data in the first blockchain network or the second blockchain network.

* * * * *